United States Patent [19]
Amemori

[11] Patent Number: 5,406,695
[45] Date of Patent: Apr. 18, 1995

[54] METHOD FOR FABRICATING THIN-FILM MAGNETIC HEADS

[75] Inventor: Kazuhiko Amemori, Kawasaki, Japan

[73] Assignee: Fujitsu Ltd., Japan

[21] Appl. No.: 144,743

[22] Filed: Oct. 28, 1993

[30] Foreign Application Priority Data

Oct. 30, 1992 [JP] Japan .................................. 4-292804

[51] Int. Cl.$^6$ .............................................. G11B 5/42
[52] U.S. Cl. ...................................... 29/603; 360/122
[58] Field of Search .................. 29/603; 360/122, 125, 360/127

[56] References Cited

U.S. PATENT DOCUMENTS

| 4,246,620 | 1/1981 | Kaminaka et al. ............... 29/603 X |
| 5,041,932 | 8/1991 | Hamilton . |
| 5,142,768 | 9/1992 | Aboaf et al. ......................... 29/603 |

Primary Examiner—Carl E. Hall
Attorney, Agent, or Firm—Greer, Burns & Crain, Ltd.

[57] ABSTRACT

A method for fabricating thin-film magnetic heads on a generally planar substrate. Each of the magnetic heads has a coil, a pole magnetically coupled with the coil, and a contact pad arranged on the bottom of the body of the magnetic head. The contact pad surrounds the free end of the pole and extends flush therewith, so that the free end of the pole and the contact pad are brought into a sliding engagement with the magnetic disk, to mitigate the wear of the pole. At the first step in the fabrication of the magnetic heads, a plurality of recesses are formed in the surface of the substrate in accordance with the arrangement of the magnetic heads to be fabricated, and the recesses are filled with a material for forming contact pads. Then the coil and the pole of each of the magnetic heads are formed on the substrate by the use of a known thin-film forming technique so that a portion of the pole is placed on the material for forming the contact pad. The substrate is then separated into a plurality of blocks.

17 Claims, 13 Drawing Sheets

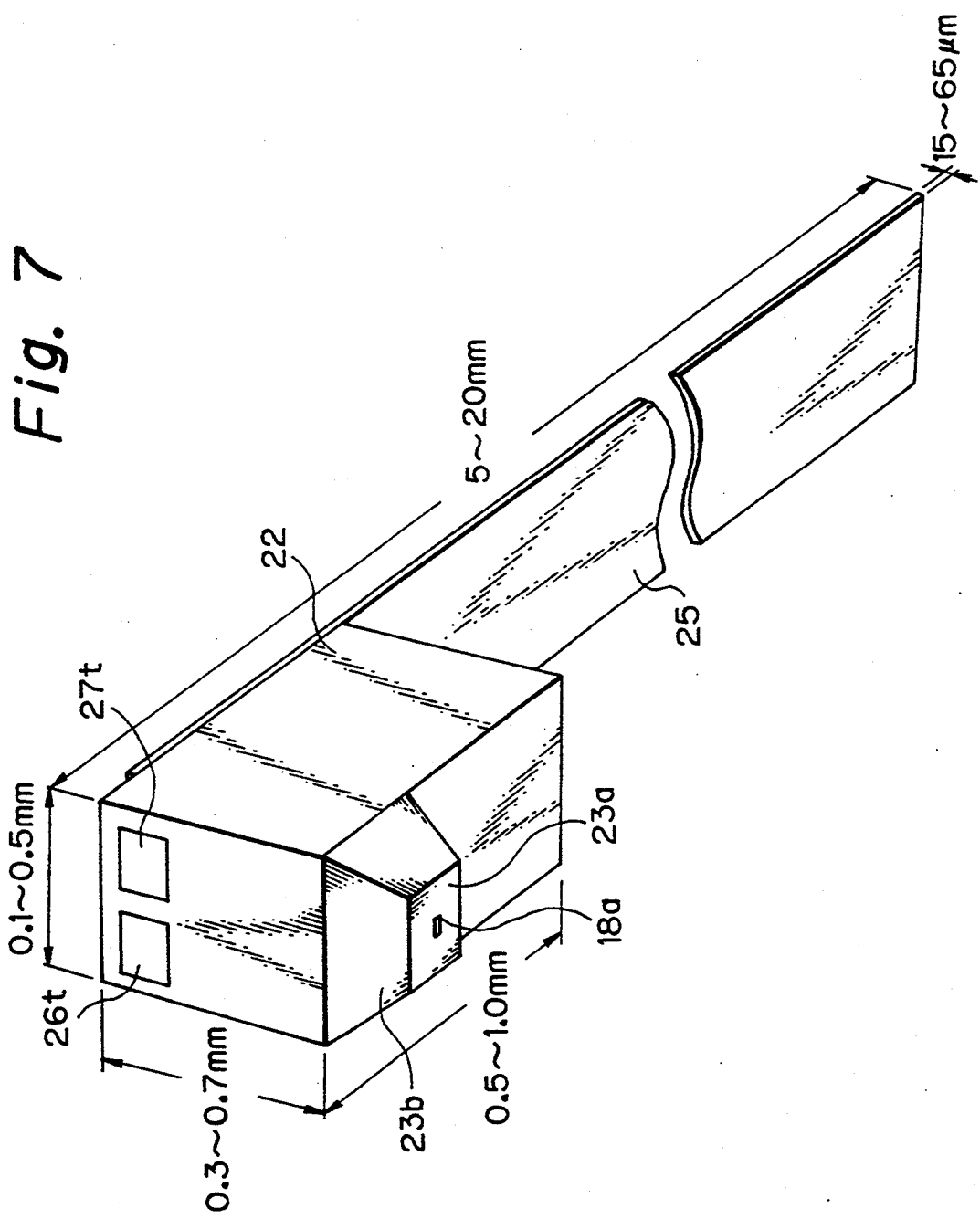

METHOD FOR FABRICATING THIN-FILM MAGNETIC HEADS

BACKGROUND OF THE INVENTION

1. Field of the Invention

The present invention relates to magnetic heads used in a magnetic disk apparatus for storing and reproducing data, and in particular, the present invention relates to a method for fabricating thin-film magnetic heads by the use of a thin-film forming technique.

2. Description of the Related Art

Thin-film magnetic heads have been increasingly used, in place of conventional monolithic magnetic heads, as magnetic heads in magnetic disk apparatuses for recording and reproducing data. With the recent development of magnetic heads having a small size and a large capacity, attempts have been made to minimize the distance between the magnetic head and the recording medium (the flying height) to realize a very dense recording format.

In a magnetic disk apparatus using magnetic disks having a relatively small diameter and thus a relatively low peripheral speed, proposals have been made in which magnetic head does not levitate above the recording medium but normally contacts the recording medium and has a sliding engagement therewith. In this case, the thin-film magnetic head is fabricated such that the supporting base structure of the magnetic head with the slider or the contact pad thereof is very light in weight and is biased with a relatively small elastic force so that the contact pressure of the magnetic head with the magnetic recording medium is small.

U.S. Pat. No. 5,041,932, for example, discloses such a small thin-film magnetic head. In this prior art, a plurality of thin-film magnetic heads are fabricated on a planar substrate such as a silicon wafer. Each of the magnetic heads has a base structure, a coil and a pole magnetically coupled with the coil to read data from and write data to the magnetic recording medium. The base structure has a pair (top and bottom) of surfaces, and a side surface perpendicular to the top and bottom surfaces. A spring arm is formed on the top surface of the base structure for mounting the magnetic head to an actuator of the magnetic disk apparatus and a contact pad for the sliding engagement with the magnetic recording medium is formed on the bottom surface of the base structure, with the spring arm and the contact pad formed unitary with the base structure. A coil is formed around a core which extends parallel to the spring arm and the coil and the core are formed within the base structure. A pole is formed on the side surface of the base structure and connected to the core. A return yoke is also arranged in the base structure near the bottom surface thereof to receive a magnetic flux emitting from the pole.

In the fabrication of the thin-film magnetic heads, the substrate is severed into a plurality of linearly elongated blocks after the coils of the magnetic heads are formed in the substrate, and the poles are subsequently formed on each of the elongated blocks. A problem is that the efficiency of the process is low since the poles must be formed, on each of the small elongated blocks, by a thin-film forming technique such as sputtering and photolithography and thus it is necessary to apply photo resist and position a mask on the small block. Also, many small blocks must be treated one by one and cannot be easily handled, so such a fabrication method is not suitable for mass production of the magnetic heads.

Other types of thin-film magnetic heads are known in which a plurality of thin-film magnetic heads are fabricated on a planar substrate such as a silicon wafer. Similar to the above described magnetic head, each of the magnetic heads has a base structure, a coil and a pole magnetically coupled with the coil to read and write data on the magnetic recording medium. The base structure has a pair (top and bottom) of surfaces, and a side surface perpendicular to the top and bottom surfaces. A spring arm is formed on the top surface of the base structure for mounting the magnetic head to an actuator of the magnetic disk apparatus and a contact pad for the sliding engagement with the magnetic recording medium is formed on the bottom surface of the base structure. In this case, however, the coil and the pole are formed on the side surface of the base structure.

In the contact type magnetic heads, it is desired that the pole which normally contacts the magnetic recording medium is wear-resistant. The contact pad surround the distal end of the pole, and the wear of the pole is mitigated if the wear of the contact pad is small. Accordingly, it is preferable to make the contact pad from a material harder than a material of the base structure of the magnetic head.

Also, it is preferable to fabricate the spring arm for mounting the magnetic head to an actuator of the magnetic disk apparatus separately from the base structure of the magnetic head to minimize the size of the magnetic heads on the substrate so that it is possible to increase the number of the magnetic heads obtainable from one substrate. The separate spring arm can be subsequently attached to the magnetic head.

SUMMARY OF THE INVENTION

The object of the present invention is to provide a method for fabricating thin-film magnetic heads by which many magnetic heads having wear-resistant contact pads can be easily fabricated.

According to the present invention, there is provided a method for fabricating thin-film magnetic heads on a generally planar substrate, each of the magnetic heads having a contact surface, a coil, a pole arranged on the substrate so that the pole is magnetically coupled with the coil and extend toward the contact surface for cooperation with a recording medium, and a contact pad arranged on the contact surface adjacent to the pole, said method comprising the steps of: forming a plurality of recesses on a surface of the substrate; filling the recesses with a material for forming the contact pad; forming the coil and the pole of each of the magnetic heads by the use of a thin-film forming technique so that a portion of the pole is placed on the material for forming the contact pad; and separating the substrate into a plurality of blocks along planes perpendicular to the pole and passing through the contact pads.

BRIEF DESCRIPTION OF THE DRAWINGS

The present invention will become more apparent from the following description of the preferred embodiments, with reference to the accompanying drawings, in which:

FIG. 7 is perspective of the magnetic head in the finally assembled condition;

DESCRIPTION OF THE PREFERRED EMBODIMENTS

Figure 1:
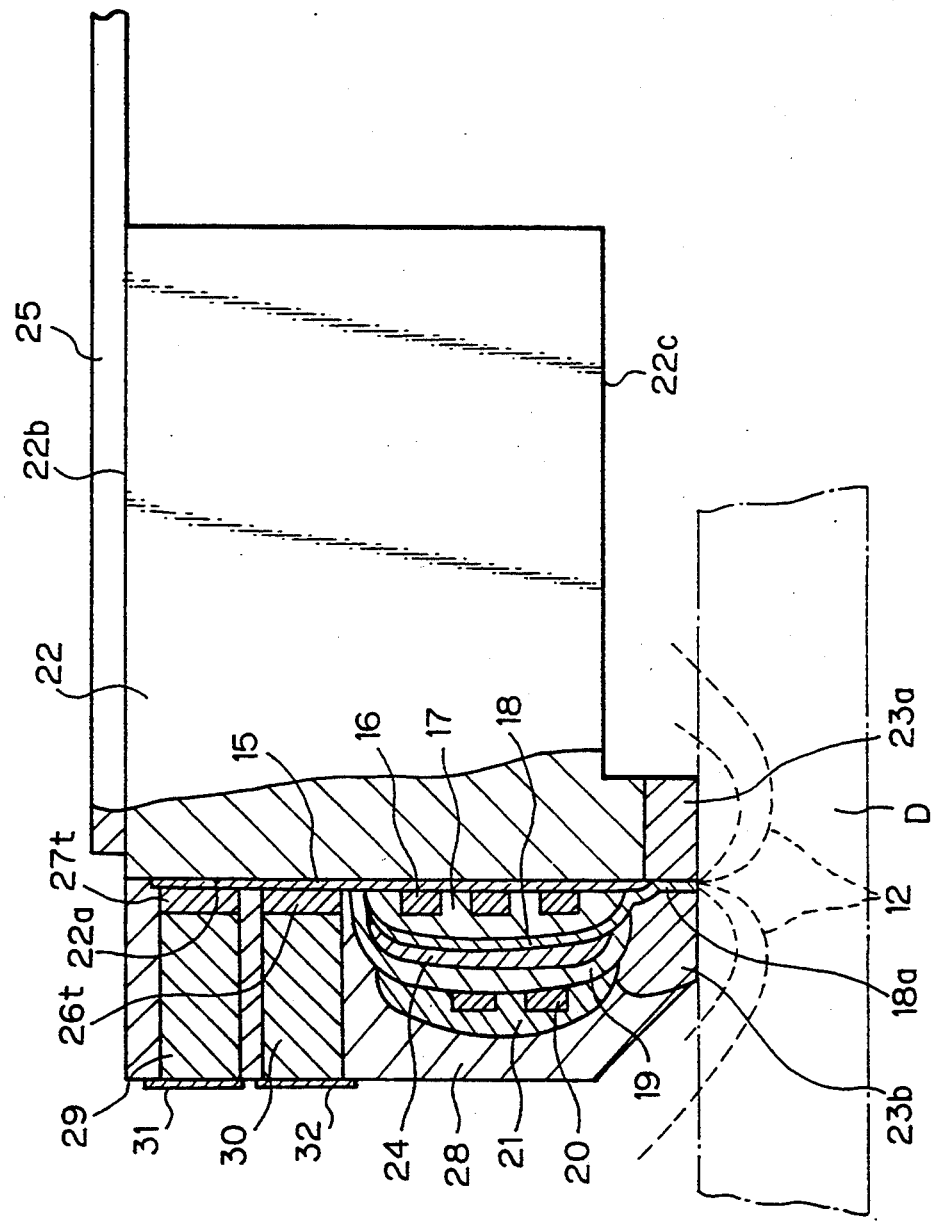
FIG. 1 is a partial cross-sectional view of a magnetic head fabricated according to the present invention.
Figure 2:
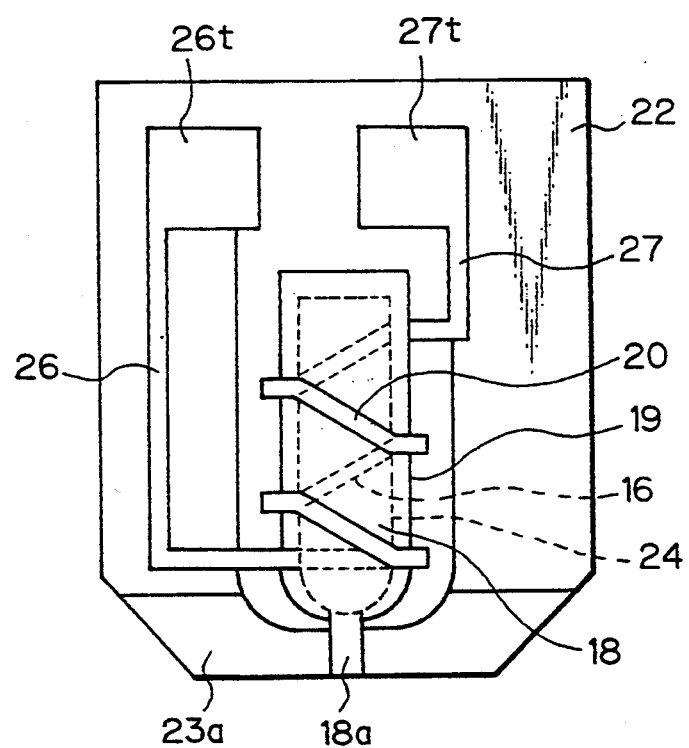
FIG. 2 is a side view of the magnetic head of FIG. 1.

FIGS. 1 and 2 show a thin-film magnetic head fabricated according to the present invention, in which FIG. 1 is a cross-sectional view and FIG. 2 is a side view just after the upper coil portion of FIG. 1 is formed. The reference character D represents a vertical recording type magnetic recording medium. The magnetic head comprises a base portion 22 which is a portion of a substrate, described below. The base portion 22 has a top surface 22b, a bottom surface 22c and a side surface 22a perpendicular to the top and bottom surfaces 22b and 22c.

The magnetic head comprises a coil 16 and 20, a main pole 18, and a contact pad 23a and 23b, the coil and the pole being formed on the side surface 22a of the base portion 22. That is, a lower insulating layer 15 is formed on the side surface 22a. The terms "lower and upper" are used with reference to the side surface 22a. A lower coil portion 16, an insulating layer 17, a main pole 18, an auxiliary pole 24, an insulating layer 19, an upper coil portion 20 which forms, with lower coil portion 16, a complete helical coil, and an upper insulating layer 21 are formed on the side surface 22a one above another in this order. A protective layer 28 is finally formed. In this embodiment, the lower and upper coil portions 16 and 20 form a complete helical coil around the main pole 18 and the main pole 18 is thus magnetically coupled with the coil 16 and 20. The main pole 18 extends beyond the bottom surface for cooperation with the recording medium D. In this case, the distal end 18a of the main pole 18 contacts the recording medium D when the magnetic head is used.

A lower contact pad 23a of a wear-resistant material is formed on the bottom surface 22c adjacent to the main pole 18. The lower contact pad 23a extends flush with the main pole 18. An upper contact pad 23b of the same wear-resistant material as of the lower contact pad 23a is also formed in a opposite relationship with 23a so as to surround with the lower contact pad 23a the main pole 18, after the formation of the upper insulating layer 21. Therefore, the wear of the main pole 18 is mitigated and the life of the main pole 18 is prolonged.

As shown in FIG. 2, lead patterns 26 and 27 are formed for connection to the ends of the lower coil portion 16 when the lower coil portion 16 is formed. The lead patterns 26 and 27 have respective free ends 26t and 27t as terminals. As shown in FIG. 1, stud-like conductors 29 and 30 of copper, for example, are formed on the free ends 26t and 27t, respectively and extend through the protective layer 28, and bonding pads 31 and 32 of gold, for example, are formed on the conductors 29 and 30.

The free end 18a of the main pole 18 is narrowed so that the magnetic flux passing through the free end 18a of the main pole 18 is concentrated, but a portion of the main pole 18 around which the coil 16 and 20 are wound is widened, as shown in FIG. 2. The auxiliary pole 24 is formed on this widened portion of the main pole 18 so that a cross-sectional area of the pole 18 and 24 increase so that a resistance to a magnetic path and flux leakage are reduced and that the magnetic and electromagnetic efficiencies are improved.

An elastic spring arm 25 for mounting the magnetic head to an actuator of the magnetic disk apparatus is fabricated separately from the base portion 22 of the magnetic head and subsequently attached to the base portion 22, as shown in FIG. 1. Therefore, it is possible to minimize the size of the magnetic head and to increase the number of the magnetic heads obtainable from one substrate, so that the magnetic heads according to the present invention can be adapted for mass production.

FIG. 3A to 3D are views illustrating the method for fabricating thin-film magnetic heads on a generally planar substrate 22w having first and second opposing surfaces 22d and 22e. The substrate is preferably made from $Al_2O_3TiC$, ferrite, Fotoceram, or barium titanate. It is intended that several hundreds of magnetic heads are arranged in a matrix with rows at a pitch Py and columns at a pitch Px on the substrate 22w.

Figure 3A:
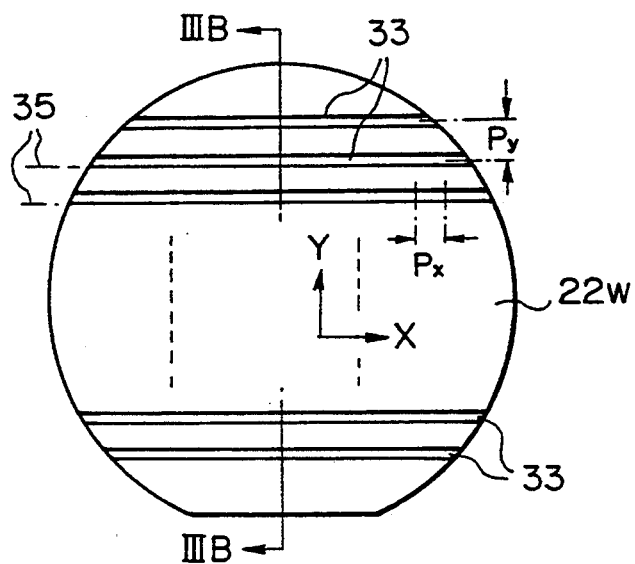
FIG. 3A is a plan view of a substrate on which a plurality of magnetic heads are fabricated according to the present invention.
Figure 3B:
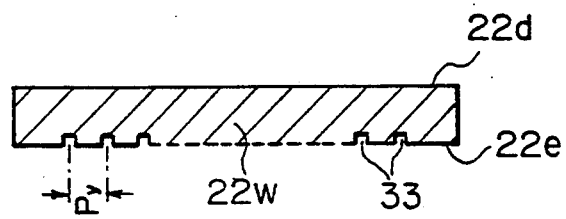
FIG. 3B is a cross-sectional view of the substrate of FIG. 3A, taken along the line IIIB—IIIB in FIG. 3A.

As shown in FIGS. 3A and 3B, a plurality of recesses in the form of linear grooves 33 are formed on one of the surfaces 22d and 22e of the substrate 22w, i.e., on the surface 22e, at the pitch Py of rows. It is, of course, possible to form linear grooves 33 at the pitch Px of columns.

Figure 3C:
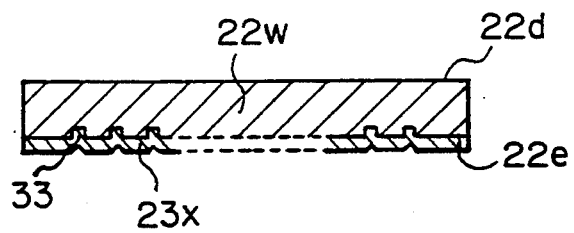
FIGS. 3C and 3D are views similar to FIG. 3B, but illustrating the subsequent fabrication steps.
Figure 3D:
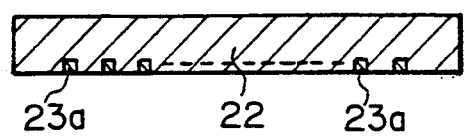
Figure 4A:
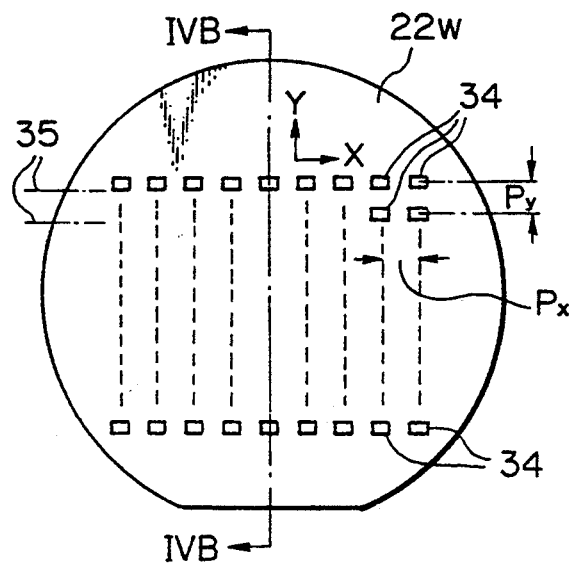
FIG. 4A is a plan view of a substrate of the modification of FIG. 3A.
Figure 4B:
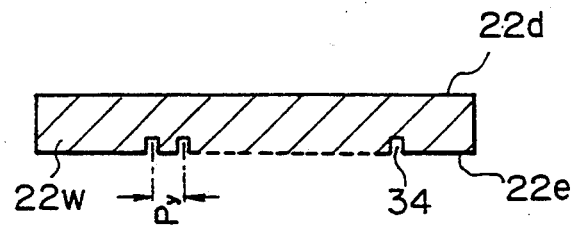
FIG. 4B is a cross-sectional view of the substrate of FIG. 4A, taken along the line IVB—IVB in FIG. 4A.
Figure 4C:
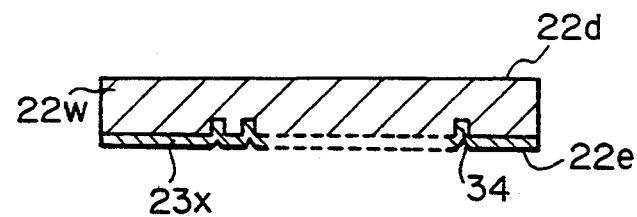
FIGS. 4C and 4D are views similar to FIG. 4B, but illustrating the subsequent fabrication steps.
Figure 4D:
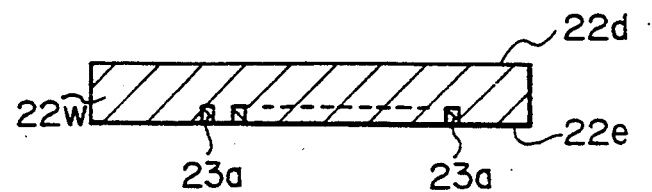

FIG. 4A to 4D illustrate a modification to FIGS. 3A to 3D. In FIGS. 4A and 4B, a plurality of recesses in the form of holes 34 are formed on the surface 22e at positions on the matrix at pitches Px and Py. FIGS. 4C and 4D are similar to FIGS. 3C and 3D.

As shown in FIG. 3C or FIG. 4C, recesses 33 or 34 are then filled with a material 23x for forming the lower contact pad 23a of FIGS. 1 and 2, by applying the material 23x on the surface 22e by CVD or sputtering. Since the lower contact pad 23a is required to be wear-resistant, the preferable material 23x is diamond like carbon (DLC) or $Al_2O_3$. For example, where the substrate 22w is ferrite, the preferably material 23x for the lower contact pad 23a is $Al_2O_3$; alternatively, where the substrate 22w is $Al_2O_3TiC$, the preferable material 23x is DLC. The material 23x is then flattened until the surface 22e of the substrate 22w is revealed, as shown in FIG. 3D or FIG. 4D.

Figure 5:
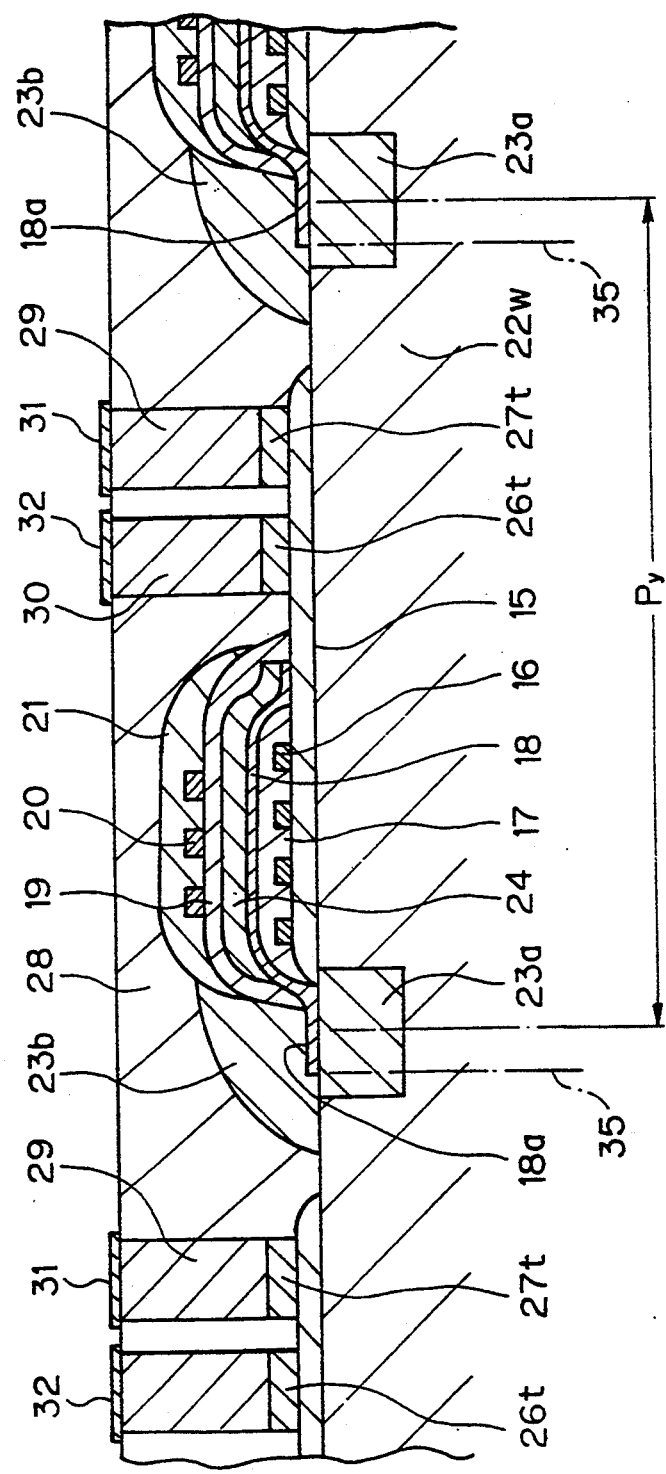
FIG. 5 is a cross-sectional view of the substrate and the magnetic heads formed thereon in the condition prior to the separation of the substrate.

The coils 16 and 20 and the poles 18 and 24 of the magnetic heads are then formed on the surface 22e of the substrate 22w having the lower contact pads 23a by the use of a thin-film forming technique such as sputtering, CVD and photolithography, as shown in FIG. 5. The surface 22e of the substrate 22w becomes the side surface 22a of the completed magnetic head in FIGS. 1 and 2. Separating planes or lines 35 are shown in FIGS. 3A and 4A, and 5 for subsequently separating the substrate 22w into blocks.

FIGS. 8A to 11B show in more detail the process of forming the coils 16 and 20 and the poles 18 and 24 of the magnetic heads. FIGS. 8A, 9A, 10A, and 11A are plan views of the substrate and a part of the magnetic head, seen from the same direction as of FIG. 3A. FIGS. 8A, 9A, 10A, and 11A also correspond to FIG. 2.

Figure 8A:
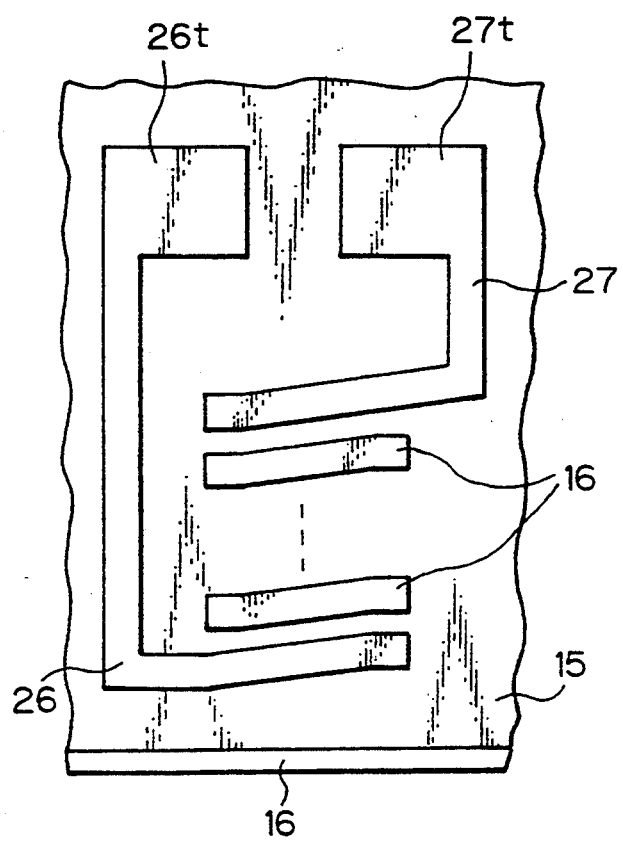
FIG. 8A is a plan view of the substrate and a part of the magnetic head, illustrating the step of forming the lower coil portion for fabricating the magnetic head.
Figure 8B:
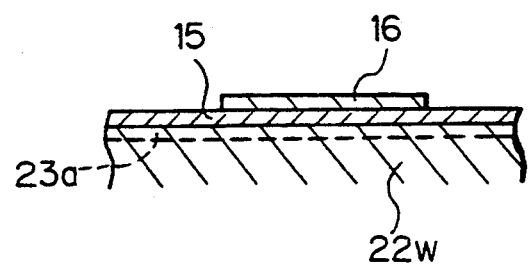
FIG. 8B is a cross-sectional view of FIG. 8A.

In FIGS. 8A and 8B, the lower insulating layer 15 is formed on the surface 22e of the substrate 22w according to the matrix of the magnetic heads after the lower contact pad 23 is formed in the substrate 22w, by applying an organic material such as photo resist to the substrate 22w by spin coat, patterning the applied material after the prebake so that the lower contact pad 23a is not covered by the material, and then baking the material. The lower coil portion 16 is then formed on the lower insulating layer 15, by forming a plating base layer of copper, plating a layer of copper thereon, and removing unnecessary portions of the copper layer to thereby obtain the lower coil portion 16, the lead patterns 26 and 27, and end terminals 26t and 27t. The lower coil portion 16 comprises flat and parallel strips having ends $e_1$.

Figure 9A:
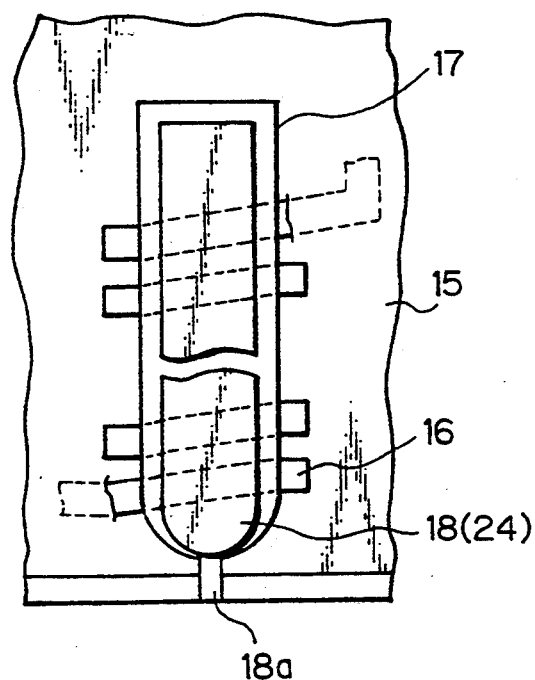
FIG. 9A is a plan view of the substrate and a part of the magnetic head, illustrating the step of forming the pole after the step of FIG. 8A.
Figure 9B:
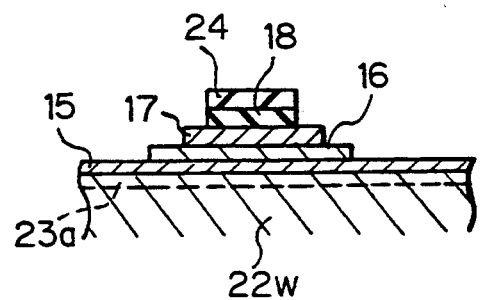
FIG. 9B is a cross-sectional view of FIG. 9A.

In FIGS. 9A and 9B, the insulating layer 17 is then formed on the lower coil portion 16, by applying an organic material such as photo resist by spin coat, so that both ends of the parallel strips of the lower coil portion 16 is not covered by the insulating layer 17. The main pole 18 is then formed on the insulating layer 17, by applying a magnetic material such as Permalloy (NiFe) by sputtering, and removing unnecessary portions of the Permalloy layer by ion etching. In this case, the free end 18a of the main pole 18 is narrowed and placed on the lower contact pad 23a. The auxiliary pole 24 is then formed on the main pole 18. The auxiliary pole 24 overlaps a major portion of the main pole 18 except the narrowed free end 18a.

Figure 10A:
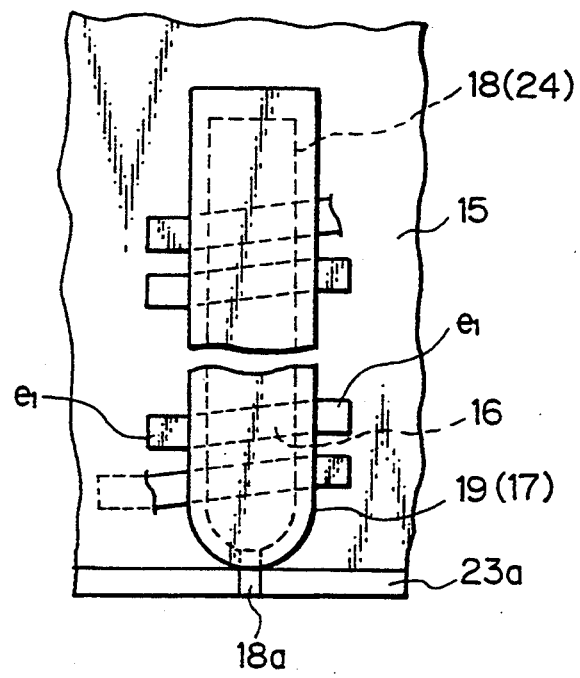
FIG. 10A is a plan view of the substrate and a part of the magnetic head, illustrating the step of forming the insulating layer after the step of FIG. 9A.
Figure 10B:
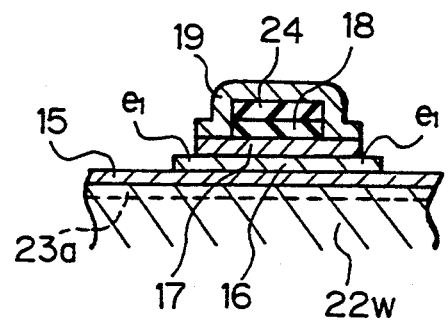
FIG. 10B is a cross-sectional view of FIG. 10A.

In FIGS. 10A and 10B, the insulating layer 19 is then formed on the auxiliary pole 24 so that the insulating layer 19 covers the surface of the auxiliary pole 24 and the side surfaces of the auxiliary pole 24 and the main pole 18 but the ends $e_1$ of the parallel strips of the lower coil portion 16 are not covered by the insulating layer 19.

Figure 11A:
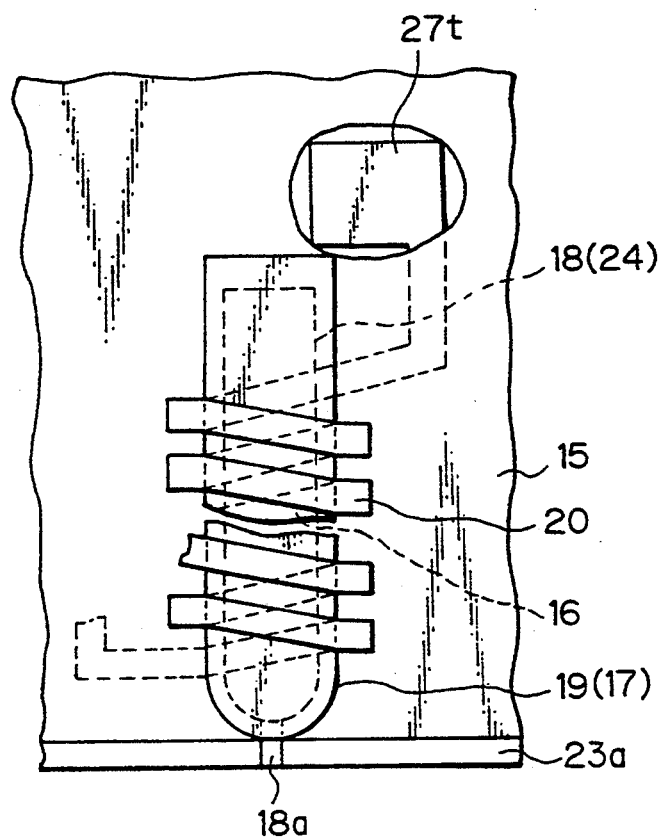
FIG. 11A is a plan view of the substrate and a part of the magnetic head, illustrating the step of forming the upper coil portion after the step of FIG. 10A.
Figure 11B:
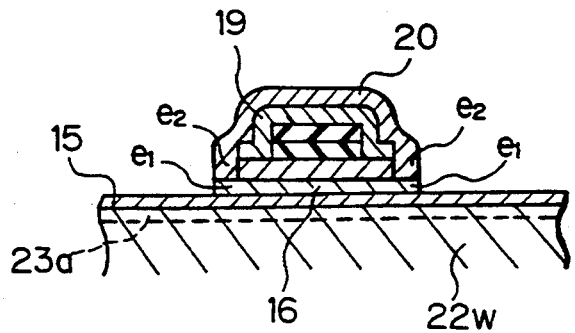
FIG. 11B is a cross-sectional view of FIG. 11A.

In FIGS. 11A and 11B, the upper coil portion 20 is then formed on the insulating layer 19, according to the similar step to that for forming the lower coil portion 16. The upper coil portion 20 comprises flat and parallel strips having ends $e_2$, which rest on the ends $e_1$ of the parallel strips of the lower coil portion. Accordingly, the lower and upper coil portions 16 and 20 complete a helical coil around the main and auxiliary poles 18 and 24. The upper insulating layer 21 is then formed on the upper coil portion 20. In this case too, the free end 18a of the main pole 18 and the lower contact pad 23a are not covered by the upper insulating layer 21.

Referring to FIG. 5, the upper contact pad 23b is formed on the free end 18a of the main pole 18 and the lower contact pad 23a, by applying the same material as of the lower contact pad 23a, such as DLC, by CVD, and removing unnecessary portions of the DLC layer by etching or a lift-off method. The stud-like conductors 29 and 30 of copper are then formed on the terminals 26t and 27t of the lead conductors 26 and 27, by plating and removing unnecessary portions. The protective layer 28 is formed on all the magnetic heads formed on the substrate 22w, by sputtering a material such as $Al_2O_3$. The protective layer 28 is then polished to flatten the surface of the protective layer 28 and to reveal and the stud-like conductors 29 and 30. The bonding pads 31 and 32 of gold are then formed on the conductors 29 and 30.

The fabrication process of the magnetic heads on the substrate 22w is completed in this manner. The substrate 22w is then separated into a plurality of linearly elongated blocks along the separating planes or lines 35, as shown in FIGS. 3A, 4A and 5. As shown in FIG. 5, the separating planes or lines 35 passes through the lower and upper contact pads 23a and 23b, and the free end 18a of the main pole 18.

Figure 6A:
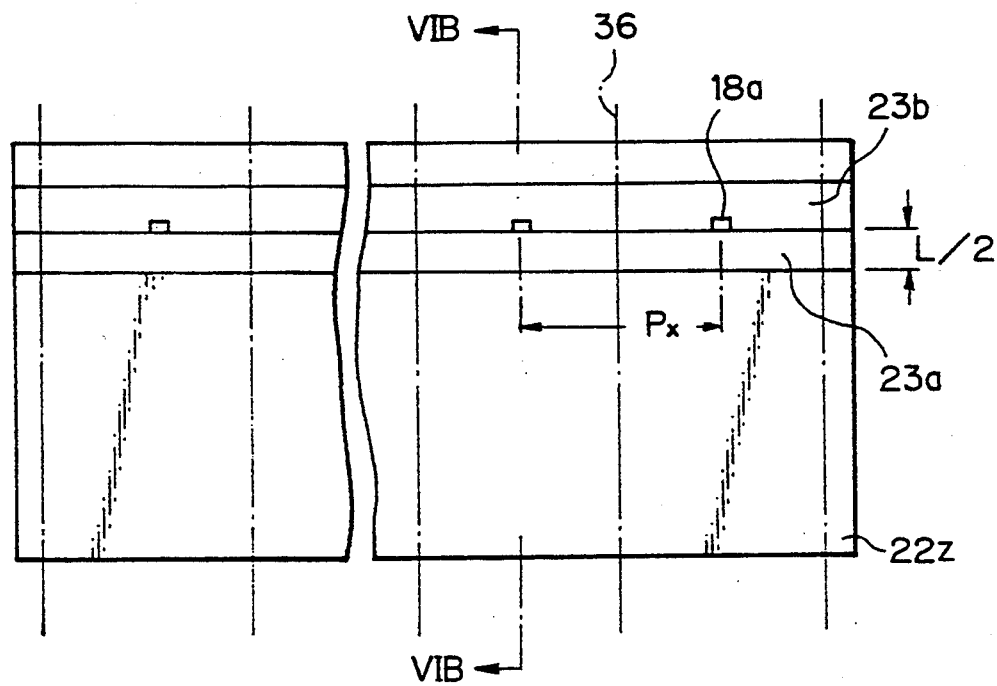
FIG. 6A is a bottom view of the elongated block severed from the substrate of FIG. 5.

FIG. 6A shows one of the elongated blocks 22z, separated along the separating planes or lines 35. The blocks 22z still include a plurality of magnetic heads corresponding to the row or column of the matrix. It can be seen that the lower and upper contact pads 23a and 23b, and the free ends 18a of the main pole 18 appear on the surface of the blocks 22z. The surface of the block 22z including the lower and upper contact pads 23a and 23b, and the free ends 18a of the main pole 18 is polished by lapping so that the free ends 18a of the main pole 18 of all magnetic heads become a predetermined height.

Figure 6B:
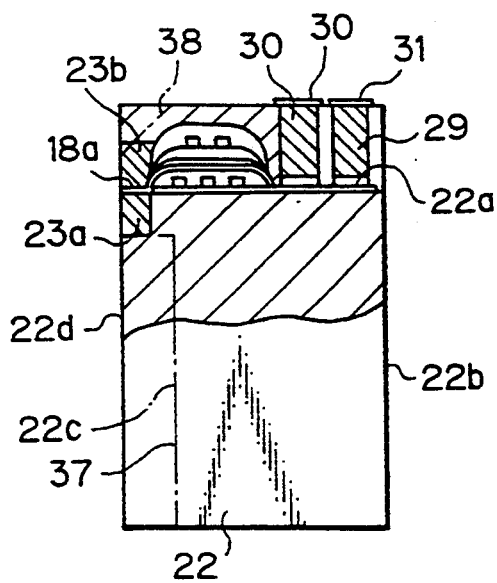
FIG. 6B is a cross-sectional view of the magnetic head separated from the block of FIG. 6A, taken along the line passing through the magnetic head.
Figure 6C:
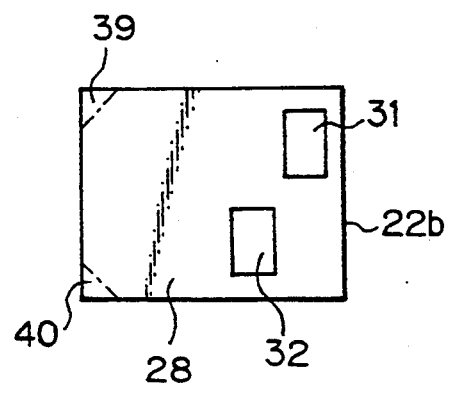
FIG. 6C is a side view of the magnetic head of FIG. 6B.

The block 22z is separated into individual magnetic heads along the separating lines or planes 36, as shown in FIG. 6A. FIG. 6B shows the separated magnetic head arranged on the side surface 22a of the base portion 22. This magnetic head is then shaped into a desired form along the line 37, by grinding the surface 22d including the lower contact pad 23a to provide the lower surface 22c which is lower than the lower contact pad 23a, as shown in FIG. 1. The upper contact 23b is ground along the broken line 38 to shape the edge thereof. Therefore, the lower and upper contacts 23a and 23b project of the lower surface 22c. The lower and upper contacts 23a and 23b are further ground along the lines 39 and 40 in FIG. 6C to chamfer the side edges of the lower and upper contacts 23a and 23b, as shown in FIG. 2. The lower and upper contacts 23a and 23b are thus completed. It is, of course, possible to shape the lower and upper contacts 23a and 23b by other means such as chemical etching using hydrofluoric acid, ion milling, or sputter etching.

FIG. 7 shows the magnetic head in the finally completed condition in which the elastic spring arm 25 is attached to the top surface 22b of the base portion of the magnetic head by an adhesive, for mounting the magnetic head to an actuator of the magnetic disk apparatus. An example of the dimensions of this magnetic head is described in FIG. 7.

Figure 12:
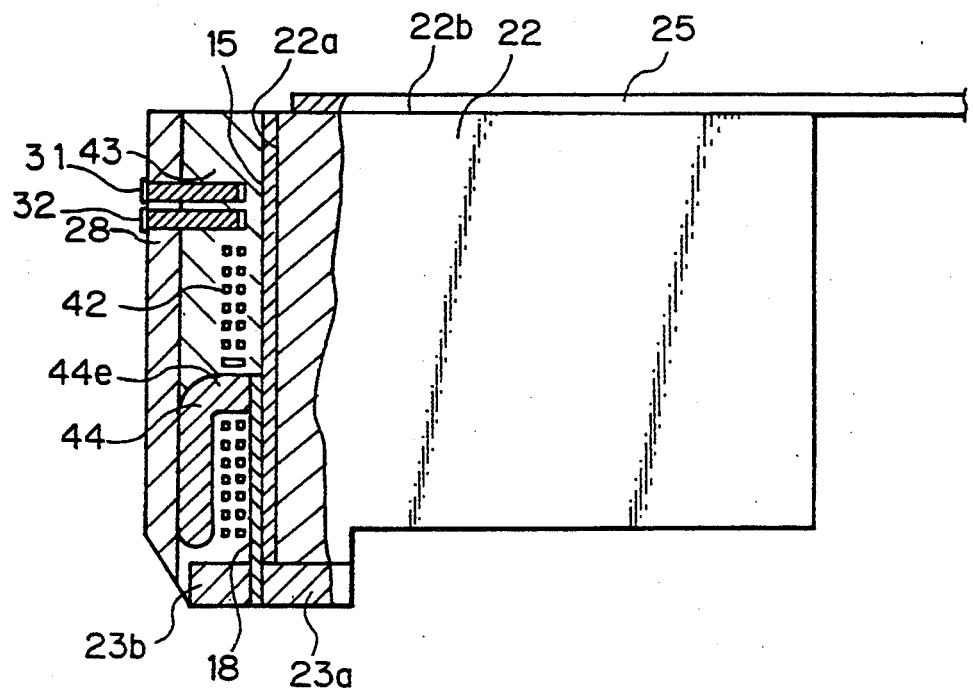
FIG. 12 is a partial cross-sectional view of another example of the magnetic head.
Figure 13:
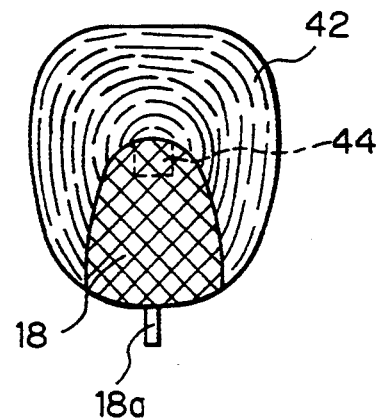
FIG. 13 is a front view of the coil of FIG. 12.

FIGS. 12 and 13 show another example of the magnetic head. In this embodiment, a thin-film magnetic head comprises a main pole 18 arranged on the side surface of the base portion 22 via an insulating layer 15, a return yoke 44 connected to the main pole 18 on the side remote from the base portion 22 and having one end portion 44e extending perpendicular to the main pole 18 with the remainder portion of the return yoke 44 extending parallel to the main pole 18 in the same direction as the main pole 18, a coil 42 arranged in the plane parallel to the side surface 22a of the base portion 22 around one end portion 44e of the yoke 44, the protective layer 28, the lower contact pad 23a, and the upper contact pad 23b. It will be understood that the lower contact pad 23a is formed on the surface of the substrate 22w, in the manner described above with reference to FIGS. 3A to 7. The pole 18 and the coil 52 are fabricated according to the steps shown in FIGS. 14A to 14E. Bonding pads 31 and 32 are also arranged.

Figure 14A:
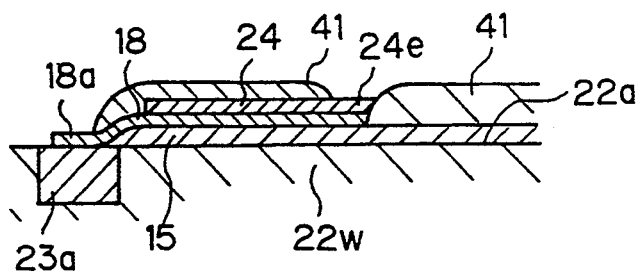
FIGS. 14A to 14E are view illustrating the formation of the magnetic head of FIGS. 12 and 13.

In FIG. 14A, the lower insulating layer 15 is formed on the surface 22e of the substrate 22w after the lower contact pad 23 is formed in the substrate 22w. The main pole 18 and the auxiliary pole 24 are then formed on the lower insulating layer 15. The insulating layer 41 is then formed on the main and auxiliary poles 18 and 24 so that the free end 18a of the main pole 18 and the end portion 24e of the auxiliary pole 24 are revealed from the insulating layer 41.

Figure 14B:
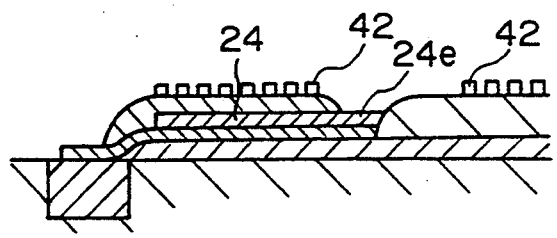
Figure 14C:
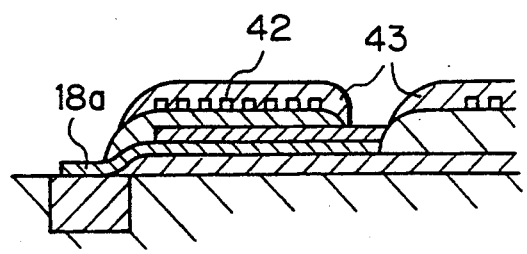
Figure 14D:
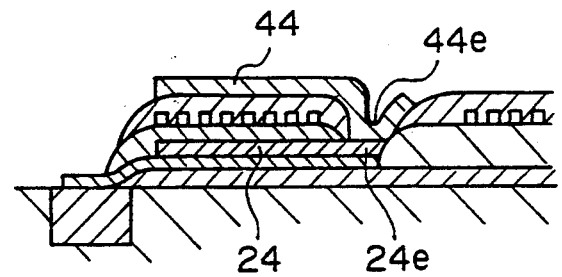
Figure 14E:
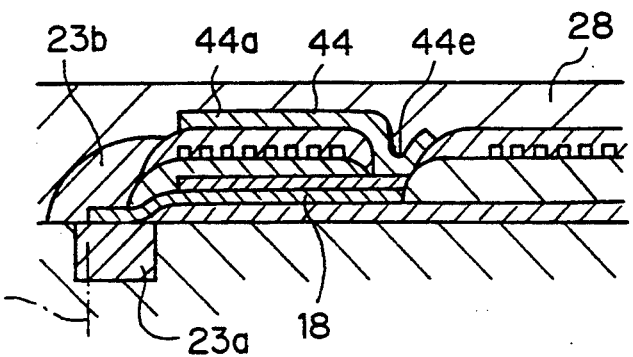

In FIG. 14B, the coil 42 is formed on the insulating layer 41 around the one end portion 24e of the auxiliary pole 24, and the lead patterns (not shown) are simultaneously formed. The insulating layer 43 is then formed on the coil 43 so that the free end 18a of the main pole 18 and one end portion 24e of the auxiliary pole 24 are revealed from the insulating layer 41, as shown in FIG. 14C. The return yoke 44 of a magnetic material such as Permalloy is then formed on the insulating layer 43 and the end portion 24e of the auxiliary pole 24, as shown in FIG. 14D. The return yoke 44 is shaped in the form of a sector to have a large area to avoid the concentration of the magnetic flux, as shown in FIG. 13. The end portion 44e of the yoke 44 is connected to the end portion 24e of the auxiliary pole 24. The upper contact pad 23b is then formed on the free end 18a of the main pole 18 and the lower contact pad 23a, as shown in FIG. 14E. The stud-like conductors (not shown) are then formed on the terminals of the lead conductors (not shown), as described above. The protective layer 28 is finally formed and the protective layer 28 is then flattened to reveal the stud-like conductors on which the bonding pads (not shown) are formed.

The substrate 22w is then separated into a plurality of linearly elongated blocks along the separating planes or lines 35, as shown in FIGS. 14E. The surface of the separated block is polished so that the free ends 18a of the main pole 18 of all magnetic heads become a predetermined height. The block is then separated into the individual magnetic heads. The free end 18a of the main pole 18 contacts the magnetic recording medium and the free end 44a of the return yoke 44 is spaced from the magnetic recording medium. Accordingly, this structure is adapted for a perpendicular writing/reading.

As described above, it is possible to fabricate thin-film magnetic heads having wear-resistant contact pads easily.

I claim:

1. A method for fabricating thin-film magnetic heads on a generally planar substrate, each of the magnetic heads having a contact surface, a coil, a pole arranged on said substrate so that said pole is magnetically coupled with the coil and extends toward the contact surface for cooperation with a recording medium, and a contact pad arranged on said contact surface adjacent to said pole, said method comprising the steps of:

forming a plurality of recesses on a surface of the substrate;

filling said recesses with a material for forming the contact pad;

forming the coil and the pole of each of the magnetic heads by the use of a thin-film forming technique so that a portion of the pole is placed on the material for forming the contact pad; and separating the substrate into a plurality of blocks along planes perpendicular to said pole and passing through the contact pads.

2. A method according to claim 1, further comprising the step of flattening the material in the recesses after the step of filling said recesses with the material for forming the contact pad and prior to the step of forming the coil and the pole.

3. A method according to claim 1, wherein said magnetic heads are arranged in a matrix with rows and columns; said separating step comprises a first separating step for separating the substrate into a plurality of blocks along lines corresponding to rows or columns, and a second separating step for separating the blocks into smaller blocks corresponding to individual magnetic heads.

4. A method according to claim 3, further comprising the step of polishing the poles after the first separating step and prior to the second separating step.

5. A method according to claim 1, wherein each of the magnetic heads further comprises an auxiliary pole on the first pole, the auxiliary pole having an area wider than the first pole; said method further comprising the step of forming the auxiliary pole after the step of forming the coil and the pole.

6. A method according to claim 1, wherein each of the magnetic heads further comprises a second contact pad arranged in an opposite relationship with said first contact pad so as to surround with said first contact said pole and extending flush with said pole; said method further comprising the step of forming the second contact pad after the step of forming the coil and the pole.

7. A method according to claim 6, wherein the material for said first and second contact pad is selected from a material harder than a material for the pole.

8. A method according to claim 6, wherein the material for said first and second contact pad is selected from a material harder than a material for the substrate.

9. A method according to claim 1, wherein each of the magnetic heads further comprises a protective layer thereon; said method further comprising the step of forming the protective layer.

10. A method according to claim 3, further comprising the step of removing a portion of said contact surface of the substrate to provide a surface which is lower than said pole and said contact pads.

11. A method according to claim 6, further comprising the step of removing a portion of said contact surface of the substrate to provide a surface which is lower than said pole and said contact pads.

12. A method according to claim 3, wherein said recesses comprise holes arranged at positions on a matrix.

13. A method according to claim 3, wherein said recesses comprise linear grooves arranged corresponding to rows or columns of a matrix.

14. A method according to claim 1, wherein each of the magnetic heads is of a suitable size to be attached to a separate elastic support member when the magnetic head is installed in a magnetic disk apparatus.

15. A method according to claim 1, wherein said coil is arranged around said pole.

16. A method according to claim 1, wherein said coil is arranged around a yoke which is connected to said pole.

17. A method for fabricating thin-film magnetic heads on a generally planar substrate, each of the magnetic heads having a contact surface, a coil, a pole arranged on said substrate so that said pole is magnetically coupled with the coil and extends toward the contact surface for cooperation with a recording medium, a first contact pad arranged on said contact surface adjacent to said pole, and a second contact pad arranged in an opposite relationship with said first contact pad so as to surround with said first contact said pole, said first and second contact pad extending flush with said pole, said method comprising the steps of:

forming a plurality of first contact pads of the magnetic heads on a surface of the substrate;

forming the coils and the poles of the magnetic heads by the use of a thin-film forming technique so that a portion of a pole of each magnetic head is placed on a respective one of the first contact pads;

separating the substrate into a plurality of blocks along planes perpendicular to said poles and passing through the contact pads; and forming a plurality of second contact pads of the magnetic heads in an opposite relationship with said first contact pads, respectively.

* * * * *